United States Patent [19]

Dunlap

[11] 4,389,790
[45] Jun. 28, 1983

[54] DRILL GUIDE

[76] Inventor: Alvin E. Dunlap, P.O. Box 861, Folsom, Calif. 95630

[21] Appl. No.: 254,691

[22] Filed: Apr. 16, 1981

[51] Int. Cl.³ .................. B23B 47/28; B23B 49/00
[52] U.S. Cl. .................... 33/185 R; 33/189; 408/115 R
[58] Field of Search ............ 33/180 R, 185 R, 189; 408/72, 72 B, 115 R, 115 B, 241 B, 241 G

[56] References Cited

U.S. PATENT DOCUMENTS

| 2,166,692 | 7/1939 | Ray | 408/115 R |
| 2,528,775 | 11/1950 | Ogden | 33/180 R |
| 3,082,651 | 3/1963 | Patrick, Jr. | 33/189 |
| 3,145,589 | 8/1964 | Jonker | 33/189 |
| 3,406,460 | 10/1968 | Colwell | 33/189 |
| 4,137,003 | 1/1979 | Budoff | 408/115 R |
| 4,253,784 | 3/1981 | Anderson | 408/115 R |

FOREIGN PATENT DOCUMENTS

| 959308 | 12/1974 | Canada | 408/115 R |
| 552501 | 4/1943 | United Kingdom | 408/115 R |
| 1314809 | 4/1973 | United Kingdom | 408/115 R |
| 738783 | 6/1980 | U.S.S.R. | 408/241 G |

Primary Examiner—Richard R. Stearns
Attorney, Agent, or Firm—Blair, Brown & Kreten

[57] ABSTRACT

A drill guide for accurate placement of bolt holes on a mud sill or the like which includes a guide block having plural bores extending therethrough from a top face and through a bottom face thereof which are suitably dimensioned and adapted to receive a drill bit for accurate bore placement on a mud sill, in which the drill guide includes an upright which is orthogonal to the guide block which insures perpendicularity of the bores and a spring biased slide which travels in a trackway on the guide block so that the upright is yieldingly connected to the guide block to cause contraction thereof, the guide block having an end face remote from the upright with a semi cylindrical groove running vertically which abuts against an associated placement marker for accurate placement of the bores within the mud sill.

10 Claims, 3 Drawing Figures

DRILL GUIDE

BACKGROUND OF THE INVENTION

With construction costs spiraling, any mechanism which can reduce the total number of man hours involved in building fabrication is indeed a useful item. To this end, a device which assists in accurate placement of bores in which a bolt is adapted to pass therethrough thereby fastening a wall framework to a concrete slab through a mud sill must be accurately positioned in order to assure the trueness of the wall relative to various interrelated building components.

The following patents reflect the state of the art in which the applicant is aware in so far as these references appear germane to the patent process:

U.S. Pat. Nos. 3,039,199—Maag, 3,874,086—Ludlam, 3,609,868—Weglin.

None of these references teach nor render obvious either singularly nor in combination the provision of a drill guide for placement of holes on a mud sill and beam in which the two relatively movable components are constrained not only by a spring as will be described hereinafter but by a slide on one component which rides within a trackway on the other so that the disposition of bores within the mud sill and beam can be assured of being vertically disposed and accurately placed for maximum strength in use with supporting a wall while allowing rapid deployment of these bores.

Further, by way of contrast, the instant application provides a means for deploying plural bores irrespective of the dimensions of the mud sill, in such a manner that the repetitive function of measuring distances from a marker onto the mud sill has been eliminated whereby the deployment of bores can proceed in an expeditious and uniform manner.

OBJECTS AND SUMMARY OF THE INVENTION

Accordingly, this invention has as an object the provision of a drill guide for use in placing bores upon a mud sill which overlies a slab or beam in conjunction with a marker that requires substantially no measurement when constrasted with traditional practice in the prior art.

It is yet a further object of this invention to provide a device of the character described above which is relatively inexpensive to manufacture, extremely durable in construction and safe to use.

It is still a further object of this invention to provide a device of the character described above in which the relative sliding disposition of the plural components defining the apparatus are of such a nature that the continued use and reliability of the sliding interengagement is of paramount importance and assured.

It is still a further object of this invention to provide a device of the character described above in which the disposition of bores can be made in a time saving manner, and without the need of expensive jigs, templates, or measurements.

These and other objects will be made manifest when considering the following detailed specification when taken in conjunction with the appended drawing figures.

BRIEF DESCRIPTION OF THE DRAWING FIGURES

FIG. 3 is a sectional view taken along lines 3—3 of FIG. 1a.

BRIEF DESCRIPTION OF THE PREFERRED EMBODIMENT

Figure 1:
FIG. 1 is a perspective view of the apparatus according to the present invention.
Figure 2:
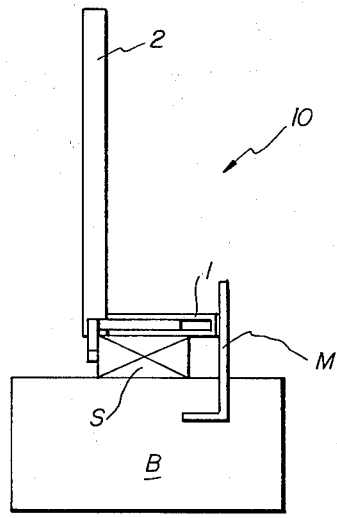
FIG. 2 is a side view thereof.
Figure 3:
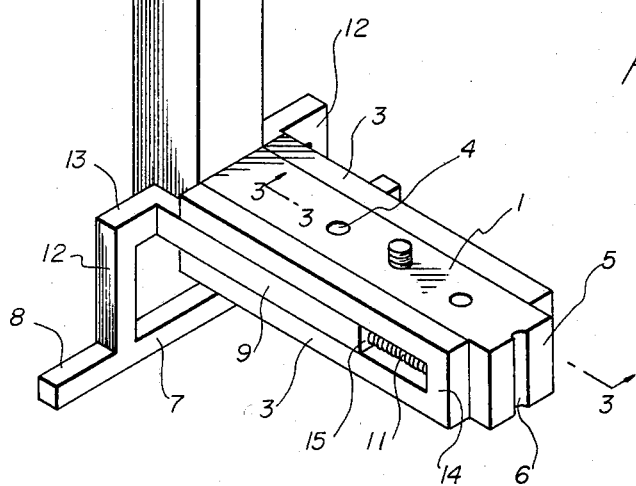
Figure 3:
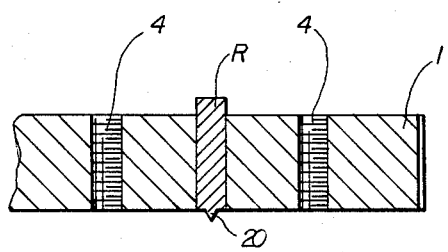

Referring to the drawings now, wherein like references numerals refer to like parts throughout the various drawing figures, reference numeral 10 is directed to the drill guide for accurate placement of bolt holes according to the present invention.

The drill guide 10 is formed from a guide block 1 which is slidably interrelated with an upright 2, the upright 2 being orthogonally disposed relative to the guide block to assure perpendicularity of the bores as will be explained hereinafter.

Means to yieldingly connect the upright to the guide block is shown perhaps best in FIG. 1 as a slide member 9 connected to a lower portion of the upright which is capable of lateral displacement within a trackway 3, 14 formed integrally with the guide block and suitably provided with a spring 11 to tend to urge the upright to the guide block in a compressive manner.

The guide block 1 is provided with top and bottom surfaces, and extending therethrough a plurality of vertically disposed bores 4 having threads therewithin are provided spaced suitably to accommodate and provide vertical bores in mud sills of various dimensions. Typically, the mud sills are formed from two by fours, two by sixes, and two by eights and therefore the plurality of bores is designed and oriented in such a manner that centering of the mud sill S is a very easy task when using the tool according to the instant application.

To this end, a semi cylindrical groove 6 is disposed on an outer face or end wall of the guide block opposite from the end of the guide block to which the upright 2 is disposed, the semi cylindrical groove 6 adapted to engage a placement marker M embedded in the slab or beam B. Preferably the end wall 5 is extended laterally outwardly away from the upright so that the groove 6 nests around the marker M and the guide block 1 is placed upon a mud sill S and the upright 2 is extended laterally away from the marker against the spring 11 tension so that the holes 4 extending through the guide block are in registry with the mud sill S for vertical deployment of the drill therethrough.

A restraint R is disposed in at least one of the bores having a pointed tip 20 for embedding in the mud sill so that when thusly deployed, translation of the guide block relative to the upright against the spring 11 is effectively overcome and the drill guide can be used without having to manually hold the device in place.

The sides of the guide block are provided with an open ended rectangular framework having upper and lower spaced parallel elements 3 and a vertical element 14 interconnected to provide a grid within which the slide 9 is suitably disposed, a terminal portion 15 of the slide remote from the upright connected to the vertical element 14 with a spring 11 as discussed hereinbefore. The slide 9 is mounted flush with sides of the upright 2. The upright is preferably an elongate rectanguloid solid having a substantially square section, and in addition a lower portion of the upright is formed as a rectangular frame having a lowermost leg 7, a pair of spaced parallel vertical legs 12 and top leg 13 which terminate at the intersection of the slide with the upright. The lowermost leg 7 has termini 8 extending outwardly beyond the rectangular frame as shown in the drawing for additional stability. It is contemplated that in one form of the preferred embodiment trackways are provided on both lateral sides of the guide block for greater stability and that the internal bores on the guide block be threaded. The drill guide can be made of any suitable material such as metal, plastic, wood, or the like for durability, and it should be appreciated that numerous structural modifications are contemplated as being part of this invention as set forth hereinabove and defined hereandbelow by the claims.

What is claimed is:

1. A drill guide for accurate placement of bolt holes on a mud sill or the like comprising in combination;
   a guide block having at least one bore therethrough adapted to receive a drill bit for accurate bore placement on the mud sill,
   an upright, orthogonal to said guide block to assure perpendicularity of the bores,
   and means to yieldingly connect said upright to said guide block and to maintain said upright orthogonal to said guide block during a range of relative movement whereby the distance between said guide block and said upright can be varied to accommodate sills of different dimensions along with an associated underlying slab and a placement marker extending up from the slab wherein said upright includes portions above and below said guide block whereby said portion below can abut against the sill.

2. The device of claim 1 wherein said means to yieldingly connect said upright to said guide block include a trackway on said guide block, a slide disposed therein extending orthogonally from and connected to said upright and a spring extending therebetween which urges said upright and guide block together.

3. The device of claim 2 wherein said trackway includes a rectangular grid having an open end wherein said slide extends in said open end wherein a slide extremity remote from said open end connects to said grid by said spring.

4. The device of claim 2 wherein two said trackways, slides and springs are provided on opposed sides of said guide block.

5. The device of claim 1 wherein said guide block includes a semi cylindrical vertical groove on an end face thereof remote from said upright which engages the placement marker.

6. The device of claim 1 wherein a lower said portion of said upright below said guide block includes a rectangular frame extending from said upright.

7. The device of claim 6 wherein said rectangular frame includes a lowermost horizontal leg with termini laterally extending beyond said frame.

8. The device of claim 1 wherein said upright is a substantially elongate rectangular solid having a square cross section.

9. The device of claim 1 wherein plural said bores are spaced on and through top and bottom faces of said guide block at appropriate intervals to accurately provide bores on mud sills having various dimensions.

10. The device of claim 1 wherein a retention means is provided on a bottom face of said guide block to keep said guide block in an extended position relative to said upright against said yielding means.

* * * * *